United States Patent [19]

Kanoshima

[11] Patent Number: 5,040,884
[45] Date of Patent: Aug. 20, 1991

[54] READING LENS SYSTEM FOR USE IN SCANNER

[75] Inventor: Yuichiro Kanoshima, Tokyo, Japan

[73] Assignee: Ricoh Company, Ltd., Tokyo, Japan

[21] Appl. No.: 560,568

[22] Filed: Jul. 31, 1990

[30] Foreign Application Priority Data

Jul. 31, 1989 [JP] Japan ................................. 1-198783
Dec. 20, 1989 [JP] Japan ................................. 1-330098

[51] Int. Cl.$^5$ ..................... G02B 9/38; G02B 9/52; G02B 9/54
[52] U.S. Cl. ..................... 359/776; 359/470
[58] Field of Search ................. 350/469, 470, 471

[56] References Cited

U.S. PATENT DOCUMENTS

| | | | |
|---|---|---|---|
| 2,559,875 | 7/1951 | Herzberger | 350/471 |
| 2,779,239 | 1/1957 | Ito | 350/470 X |
| 2,792,749 | 5/1957 | Koch | 350/470 X |
| 3,817,599 | 6/1974 | McCrobie | 350/471 X |
| 4,671,627 | 6/1987 | Shinohara | 350/471 |

Primary Examiner—Scott J. Sugarman
Attorney, Agent, or Firm—Oblon, Spivak, McClelland, Maier & Neustadt

[57] ABSTRACT

A reading lens system for a scanner is used at a reduced magnification so as to read an original image at a high speed, and comprises, successively in order from an object toward an image, a first lens unit to a fifth lens unit and an aperture disposed between the second lens unit and the third lens unit. The first lens unit comprises a positive lens serving as a first lens and a negative lens serving as a second lens and being cemented on an image side of the first lens. The second lens unit comprises a meniscus lens serving as a third lens, of which convex surface faces the object. The third lens unit comprises a meniscus lens serving as a fourth lens, of which convex surface faces an image. The fourth lens unit comprises a biconcave lens serving as a fifth lens and a biconvex lens serving as sixth lens and being cemented on the image side of the fifth lens. The fifth lens unit comprises a plane-parallel glass plate serving as a seventh lens. The lens system has the ratio $f/f_{12}$ within the predetermined range where f is the focal length of the entire lens system, and $f_{12}$ is the focal length of the first lens unit.

2 Claims, 10 Drawing Sheets

READING LENS SYSTEM FOR USE IN SCANNER

BACKGROUND OF THE INVENTION

1. Field of the Invention

The present invention relates to a reading lens system for use in a scanner, which is used to read an original image in a device such as a facsimile transmitter/receiver, and a digital copying machine.

2. Description of the Related Art

In connection with the facsimile transmitter/receiver or digital copying machine, it has been heretofore well known that an original image is scanned and read by means of a solid state image reading device such as a CCD (charge-coupled device). The reading lens system is used for such a purpose to form a scanned image on a solid state image reading device.

As the pixel size in the solid state image reading device has become smaller, the reading lens systems have been required to have a high resolution. For example, when the original image is read by a CCD whose pixel size is 7 μm, the lens system should have a resolution of 71.4 lines/mm on a light receiving surface of the CCD, and is required to produce an image with sufficiently high contrast for the above spacial frequency from the center to the peripheral area of the imaging surface.

Image reading devices have been always required to be more compact and to perform speedier image reading. To meet such demands, the reading lens system should have a smaller distance between the object and the image surface, a high resolution, a wide field of view, and a small F number.

Examples of such reading lens systems are disclosed in Japanese Laid-open Patent Publication Nos. 075,721/1988 and 023,215/1989, wherein lens system have 5 lens units comprising 7 lenses.

Those lens system have F number (F/No) of about 4.0, which is not enough to perform high speed image reading.

SUMMARY OF THE INVENTION

It is therefore an object of this invention to provide a reading lens system for a scanner. The lens system has a wide filed of view of about 20° in a half angle, a high resolution, and F number of about 3.5.

Two kinds of lens systems are proposed according to this invention. Both of the lens systems have the same lens configuration.

As illustrated in FIG. 1, each of the reading lens systems according to this invention comprises, successively in order from an object (at the left side of FIG. 1) to an image, a first lens unit 1 to a fifth lens unit 5, with an aperture 15 disposed between a second lens unit 2 and a third lens unit 3.

The first lens unit 1 comprises a first lens 10 and a second lens 12 cemented on an image side of the first lens 10. The first lens 10 is a positive lens, and the second lens is a negative lens.

The second lens unit 2 comprises a meniscus lens which serves as a third lens 14 and whose convex surface faces the object side.

The third lens unit 3 comprises a meniscus lens which serves as a fourth lens 16 and whose convex surface faces the image side.

The fourth lens unit 4 comprises a fifth lens 18 and a sixth lens 20 cemented to the image side of the fifth lens 18. The fifth lens 18 is a double-concave lens, and the sixth lens 20 is a double-convex lens.

The fifth lens unit 5 comprises a plane-parallel glass plate serving as a seventh lens 22, and also serving as a cover for a solid state image reading device (CCD).

The lens system according to this invention has thus five lens units comprising seven lenses.

A first kind of the lens system according to this invention satisfies the following conditions:

$$1.01 < f/f_{12} < 1.05 \quad (1\text{-}I)$$

$$0.02 < n_2 - n_1 \quad (1\text{-}II)$$

where f is the focal length of the entire reading lens system; $f_{12}$ is the focal length of the first lens unit 1; and $n_1$, $n_2$ are refractive indices of materials composing the first lens 10 and the second lens 12.

A second kind of the lens system of this invention satisfies the following condition.

$$1.05 \leq f/f_{12} < 1.15 \quad (2\text{-}I)$$

With the foregoing lens system having 5 lens units comprising 7 lenses, the first lens unit should have a suitable refractive power so as to accomplish a wide field of view and a large aperture ratio. If the refractive power of the first lens unit is too strong, the field of view will be narrowed, while if it is too weak, an image will be deteriorated at its middle image height area. Therefore, if the refractive power of the first lens unit is either too weak or too strong, it will not be possible to hold a high quality image throughout the image area.

From the foregoing reasons, the lens system should have appropriate ratio between $f_{12}$ and f, which correspond to the refractive power of the first lens unit and the refractive power of entire lens system, respectively. The conditions (1-I) and (2-I) specify the ratios between f and $f_{12}$.

With the first kind of the lens system, $f/f_{12}$ is in the range between 1.01 and 1.05. This range is the same as that specified in Japanese Laid-open Patent Publication No. 023,215/1989, in which the F number is about 4.0. However, the F number in the first kind of the lens system of this invention can be reduced to about 3.5 while satisfying the above conditions (1-I) and (1-II).

In a lens system similar to that of this invention, if $f/f_{12}$ were below the lowest limit of the condition (1-I), the refractive power of the first lens unit would become too weak, and the image would be deteriorated in the middle image height area. On the contrary, if $f/f_{12}$ exceeded the upper limit of the condition (2-I), the refractive power of the first lens unit would be too strong to assure the field of view of about 20°. Therefore, the condition $1.01 < f/f_{12} < 1.15$ should be satisfied. However, the F umber of 3.5 is not realized until not only the condition (1-I) but also the condition (1-II) should be satisfied simultaneously.

If the condition (1-I) is not satisfied, Petzval sum becomes smaller and the image surface is over corrected while the spherical aberration is under corrected, which will cause an on-axis and ex-axis imbalance of aberrations. Consequently the lens system cannot form a good image throughout the on-axis and ex-axis areas.

With the second kind of the reading lens system, $f/f_{12}$ in the condition (2-I) is between 1.05 and 1.15. This range partially coincides with the range disclosed in Japanese Laid-open Patent Publication No. 75721/1988.

With the above-cited reading system, the fourth lens unit is formed by a negative meniscus lens (the fifth lens) and a positive meniscus lens (the sixth lens) which is cemented on the image side of the fifth lens. $f/f_{12}$ is between 1.09 and 1.20, and the F number is about 4.0.

In the second kind of the lens system of this invention, the fourth lens unit comprises the fifth lens made of a double-concave lens and the sixth lens made of a double-convex lens, which being cemented on the fifth lens. The F number of about 3.5 is realized by the above configuration of the fourth lens unit and the condition (1-I).

DESCRIPTION OF THE EMBODIMENTS

Embodiments 1 to 9 of this invention will be given below.

Embodiments 1 and 2 are concerned with the first kind of the reading lens system of this invention, and Embodiments 3 to 9 are concerned with the second kind of the reading lens system.

In each of Embodiments 1 to 9, F/No stands for F number; f: a focal length of the entire lens system for d-line; m: magnification; ω: a half angle.

Figure 1:
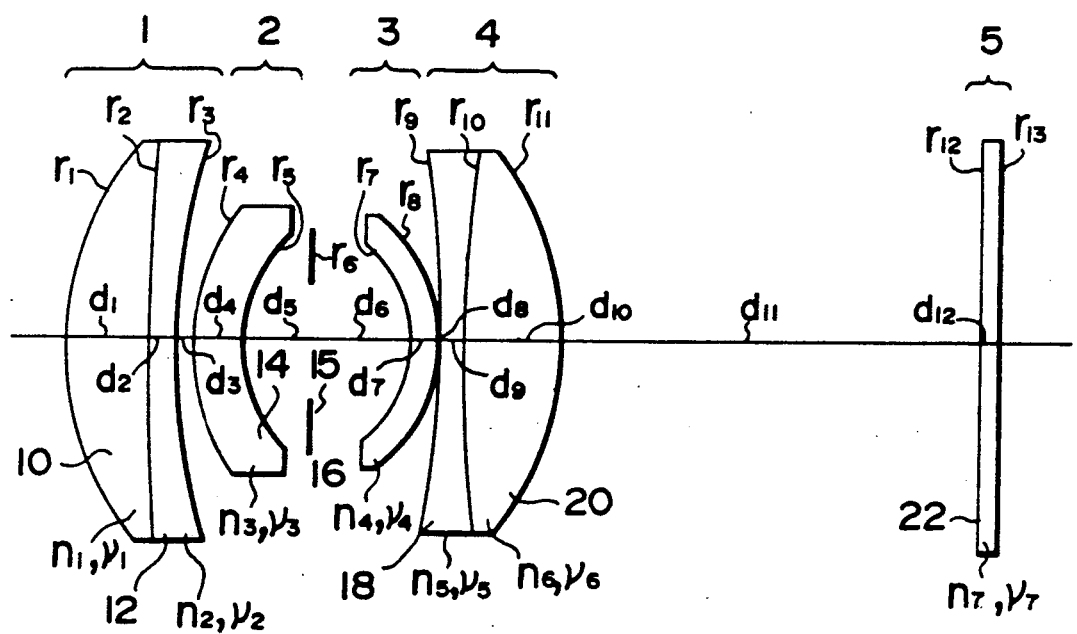
FIG. 1 is a view of a reading lens system according to this invention.
Figure 2:
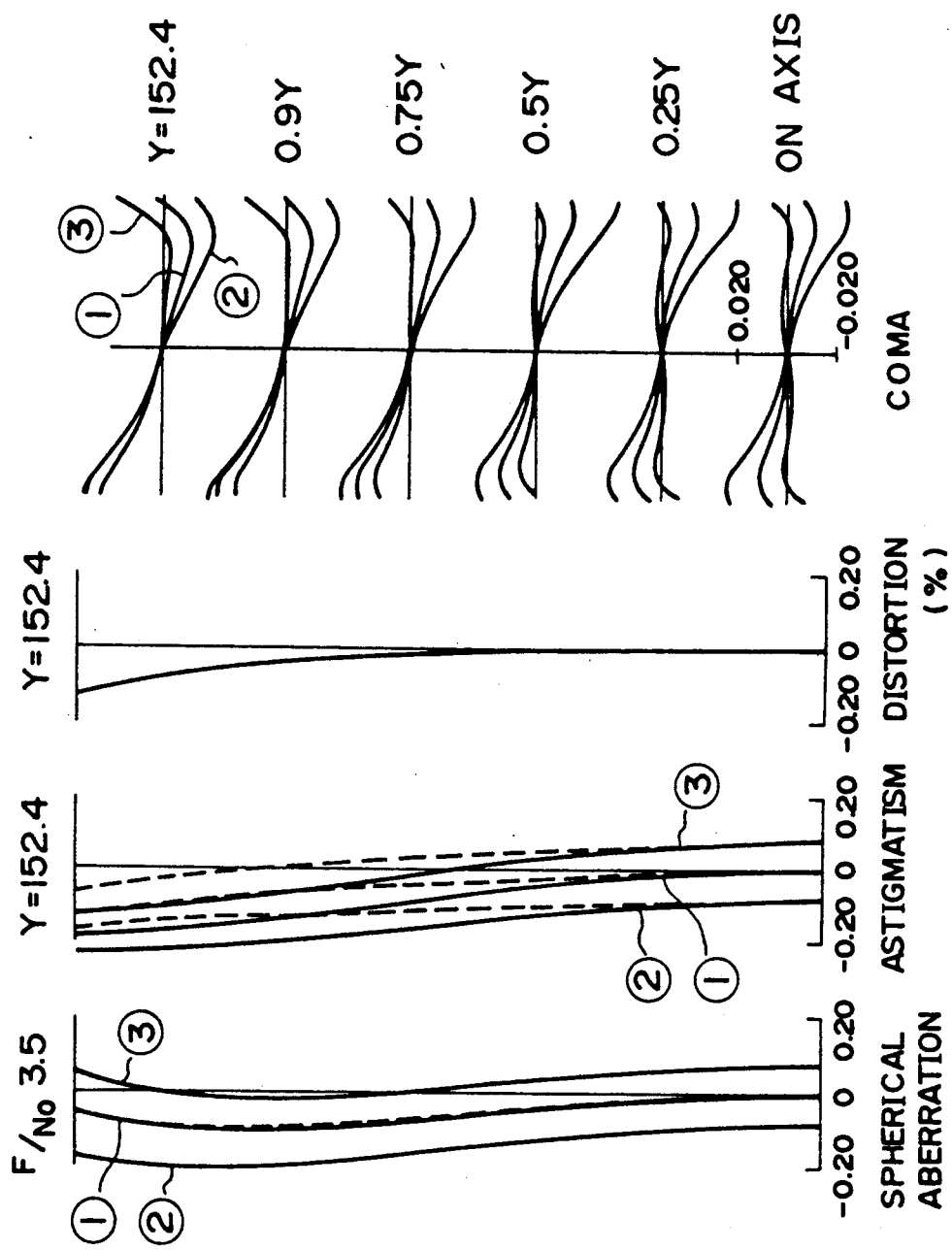
FIGS. 2 and 3 are diagrams showing aberrations of the reading lens system according to the first kind of the lens system of this invention.
Figure 3:
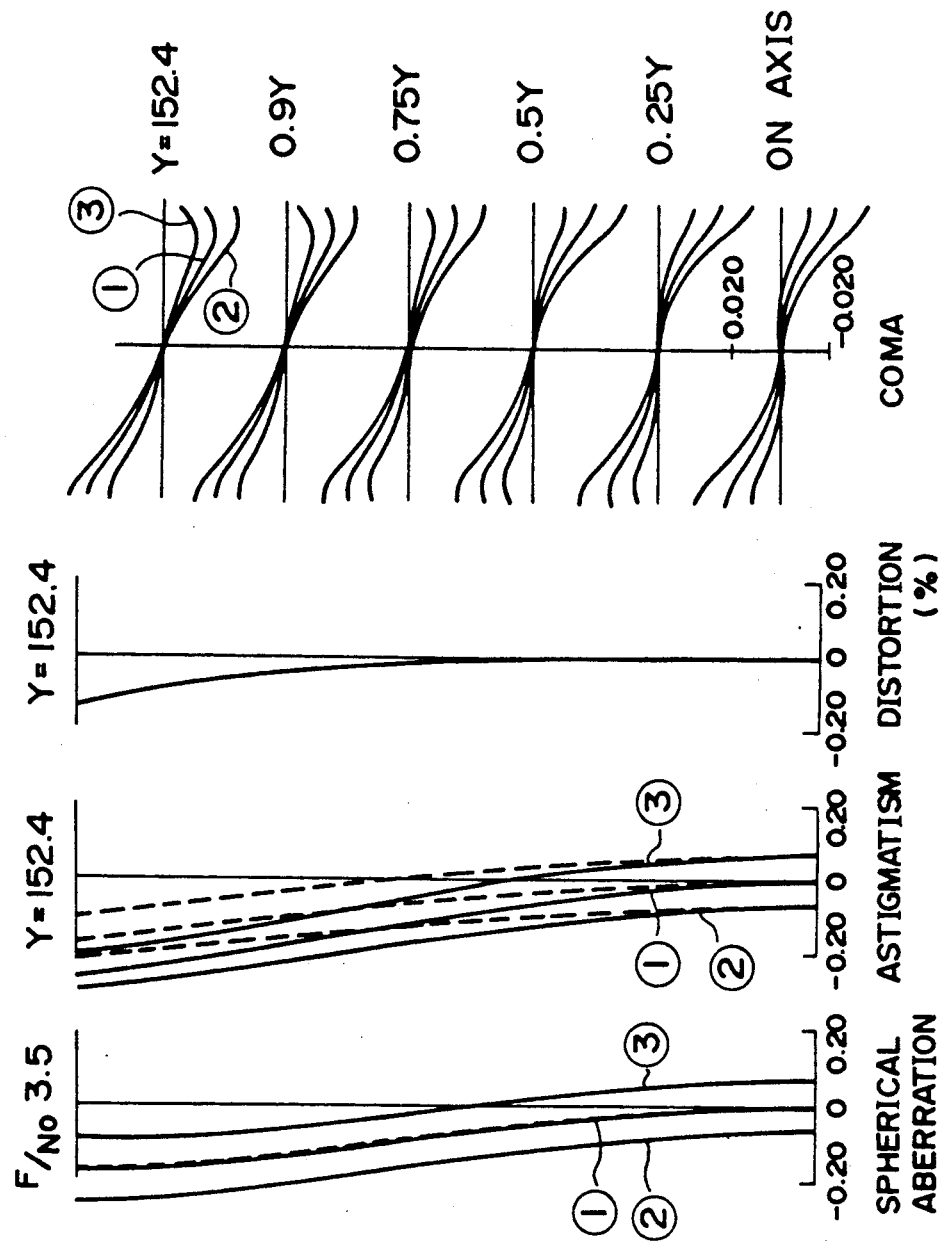
Figure 4:
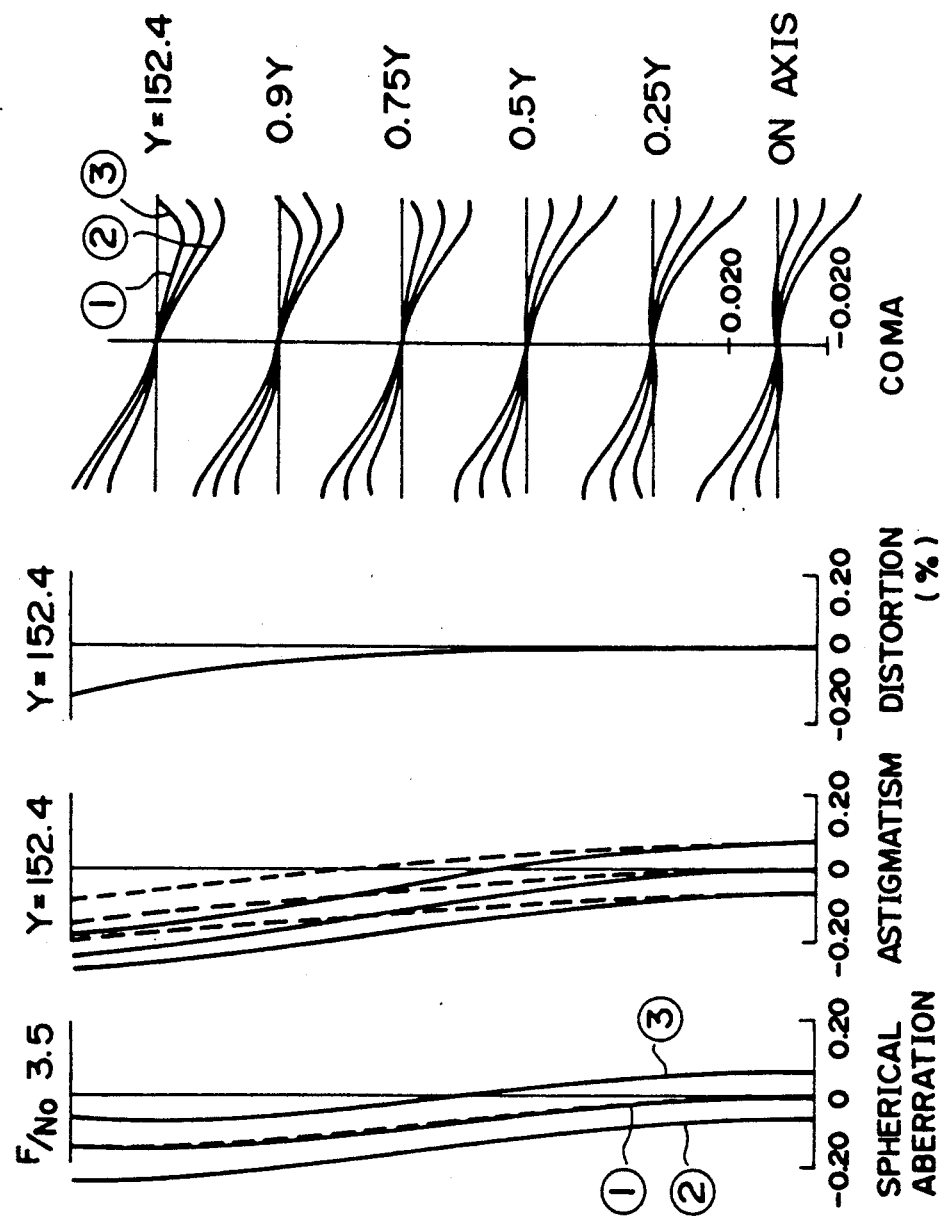
FIGS. 4 to 10 are diagrams showing aberrations of the reading lens system according to the second kind of the lens system of this invention.
Figure 5:
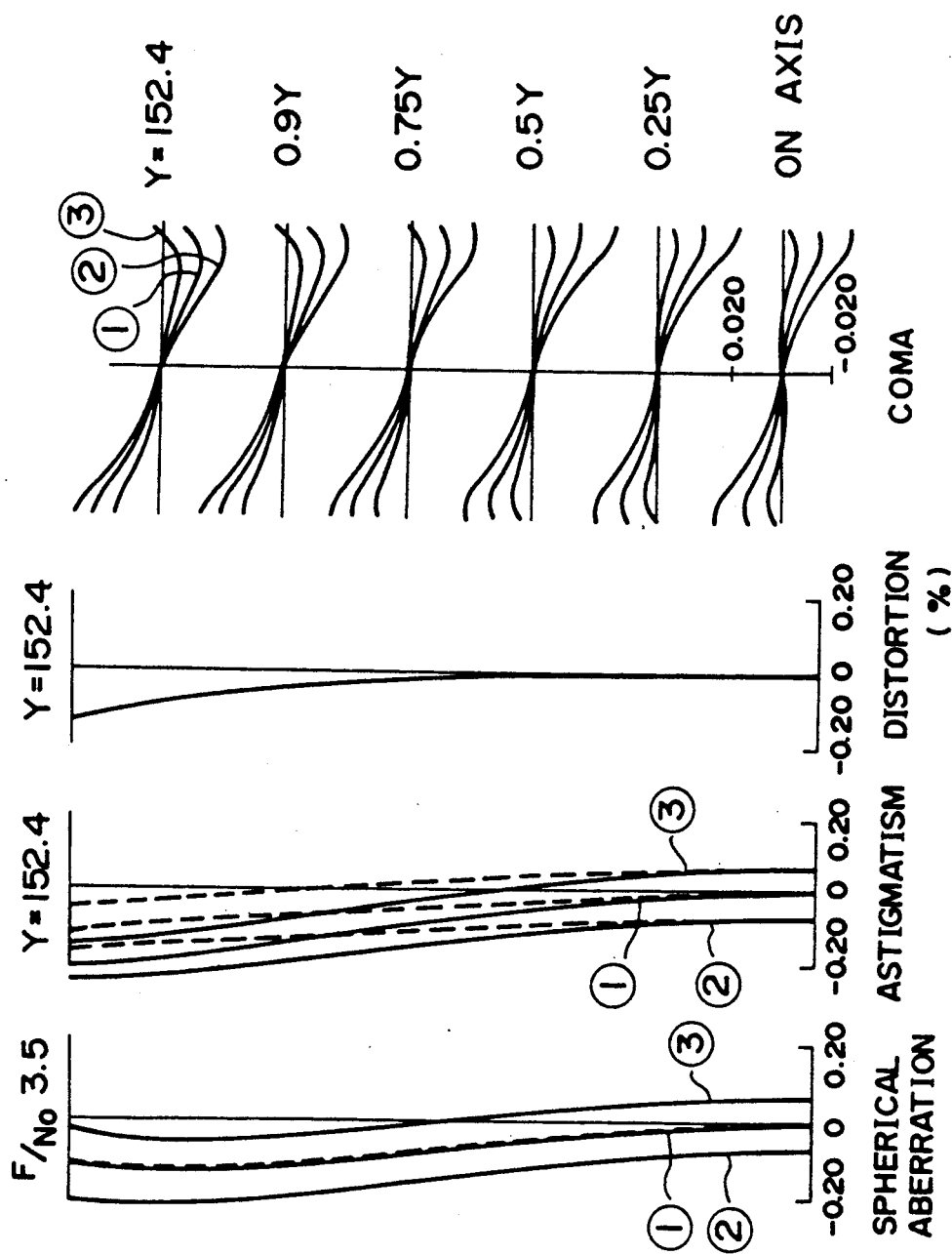
Figure 6:
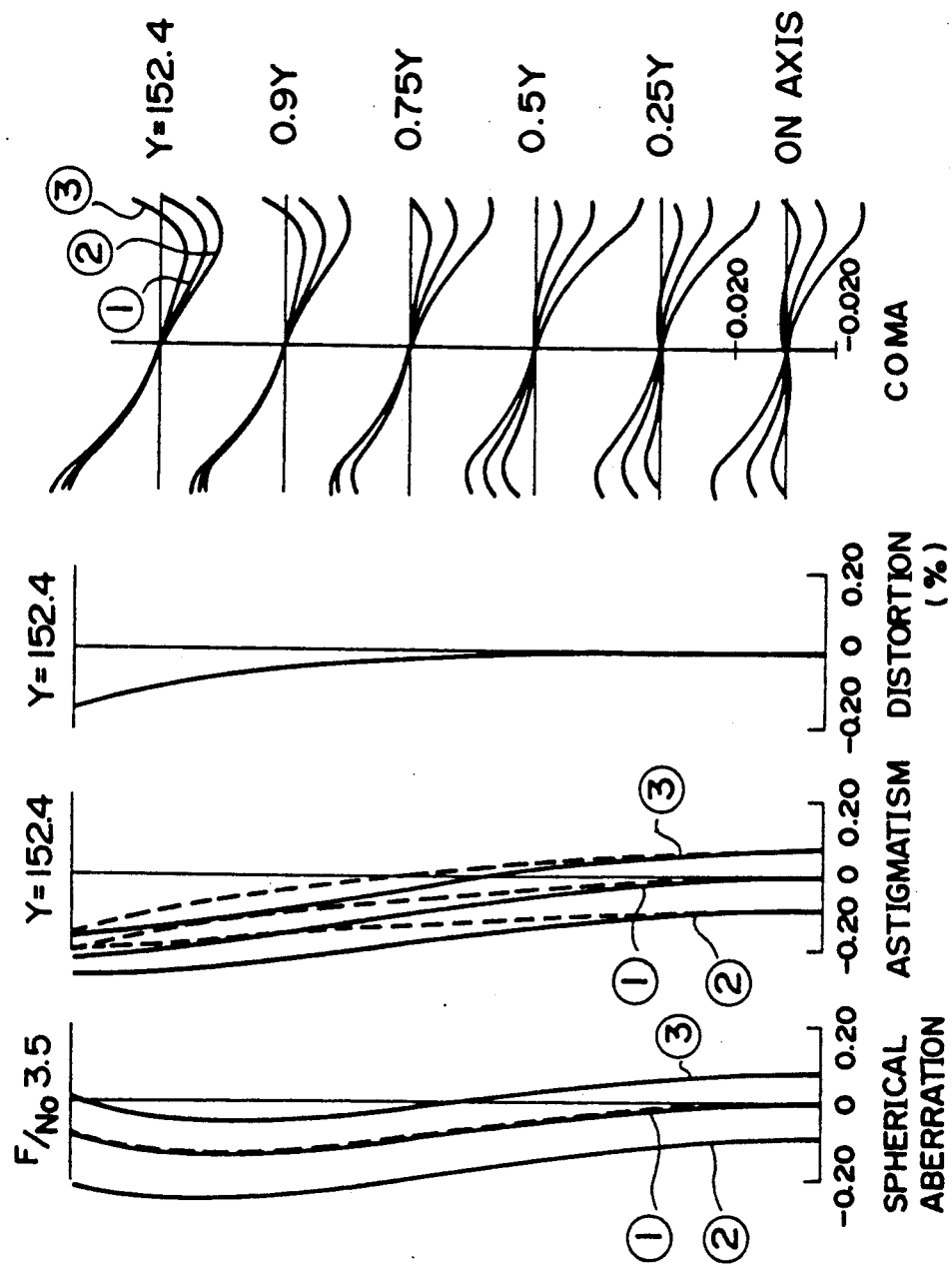
Figure 7:
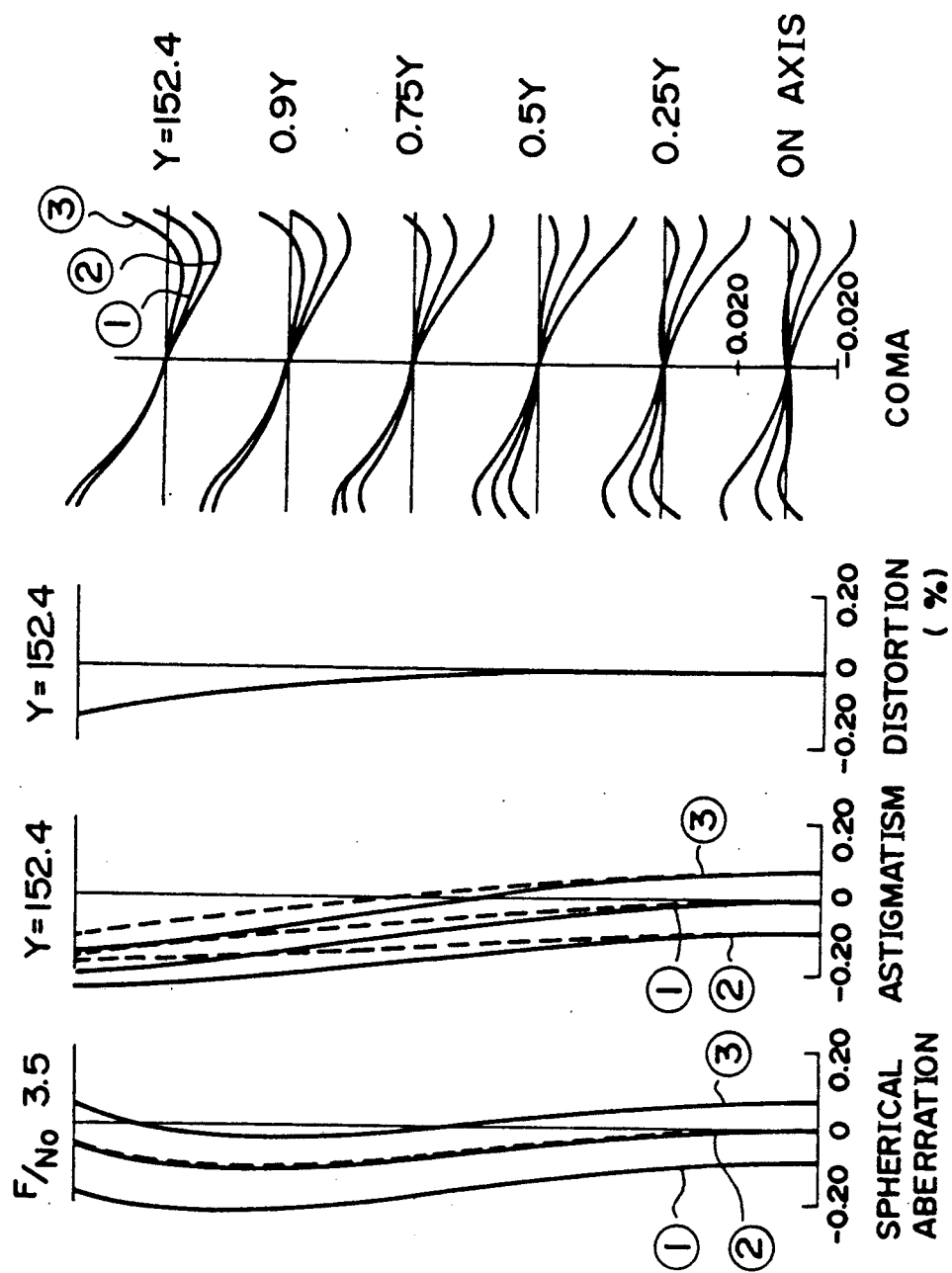
Figure 8:
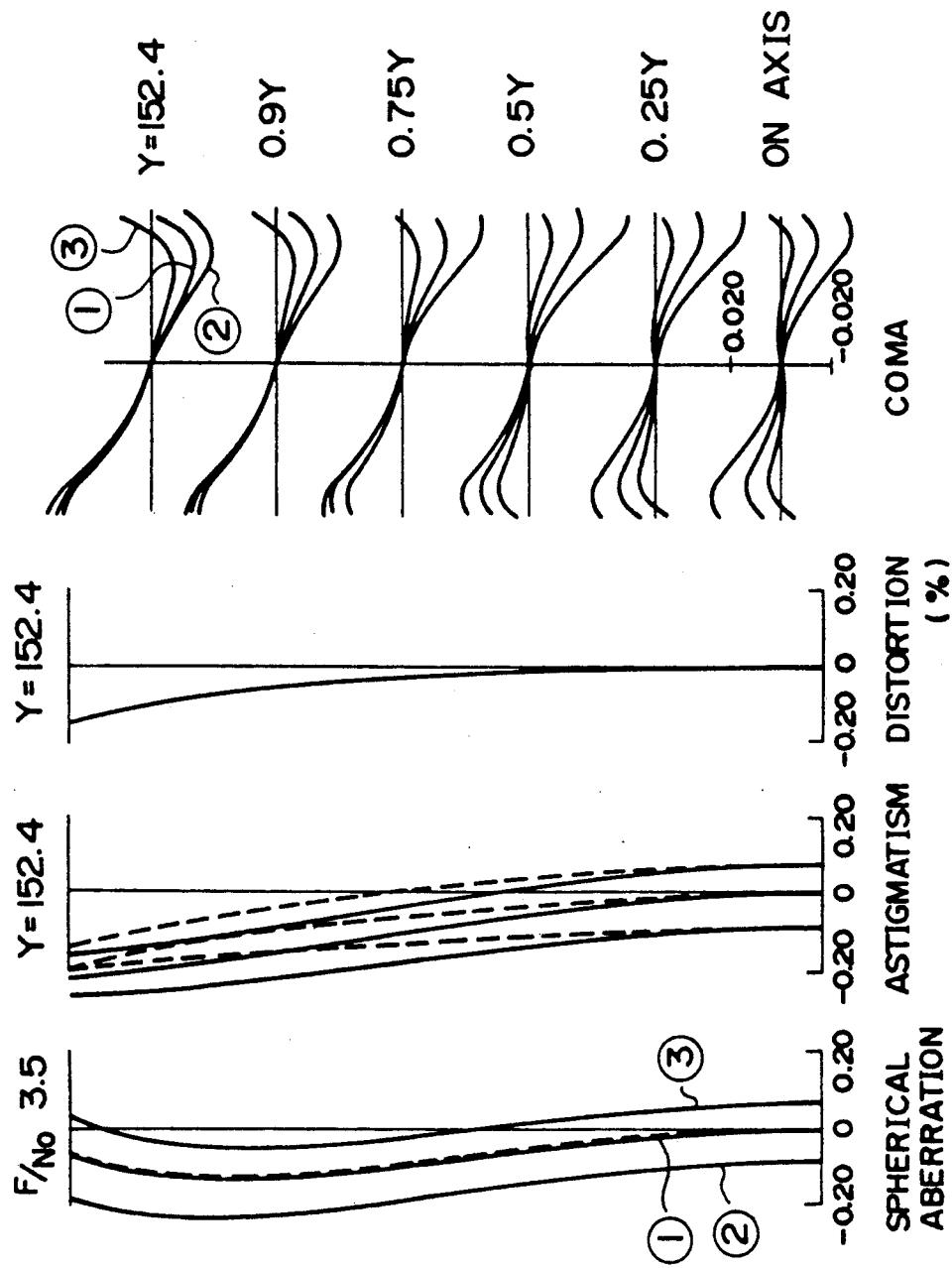
Figure 9:
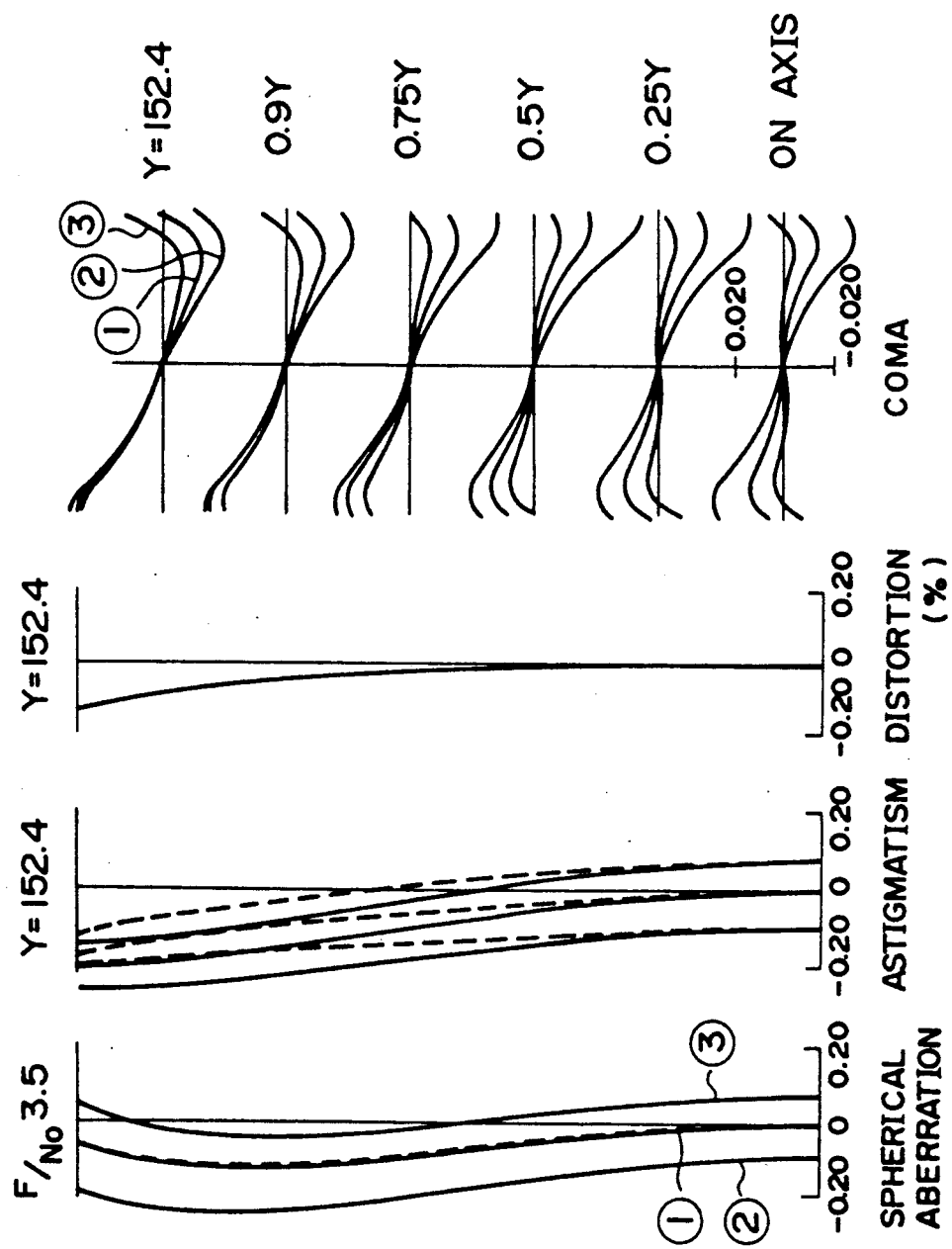
Figure 10:
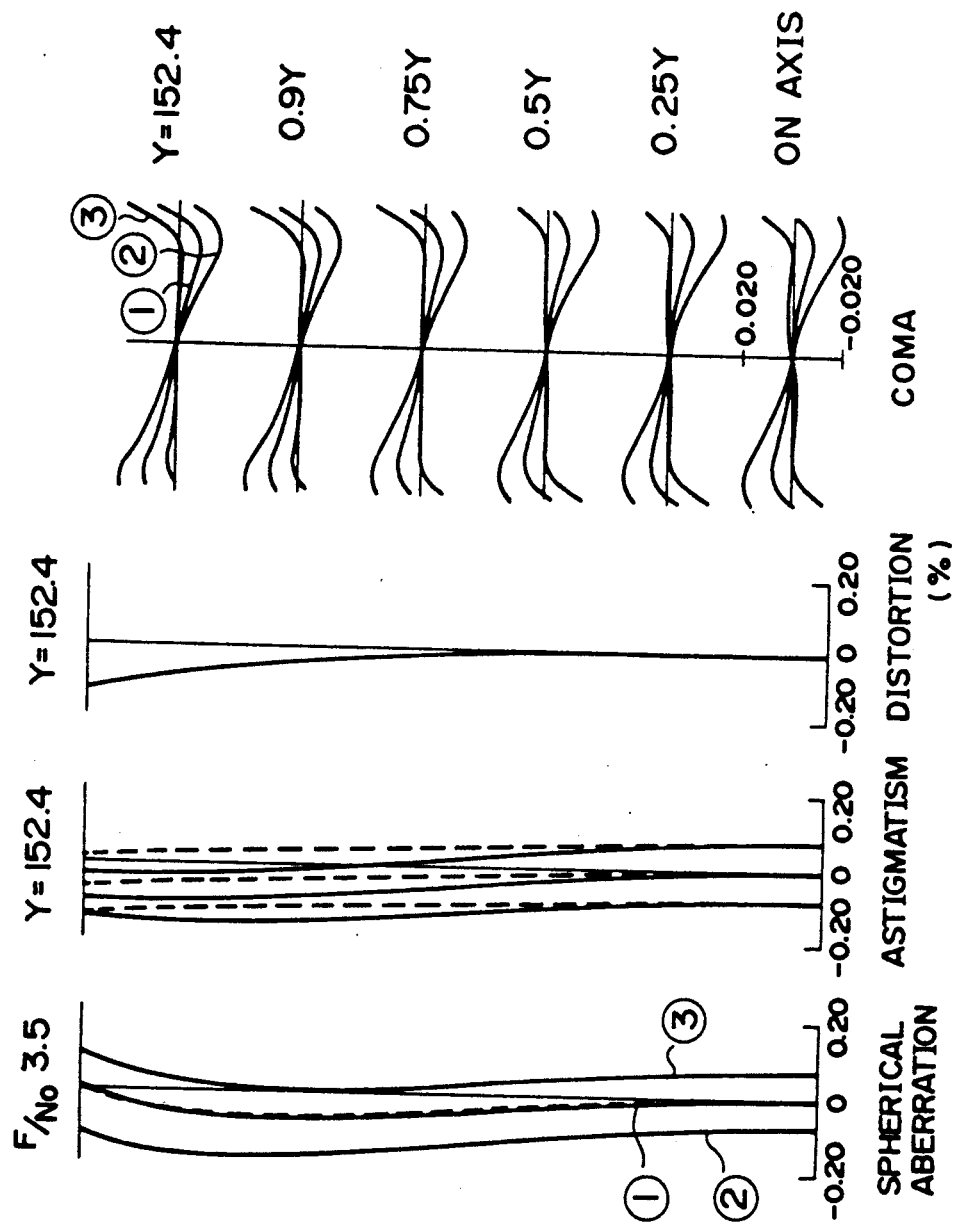

Furthermore, $r_i$ (i=1 to 13) represents the radius of curvature of the l-th lens surface as counted from the object side to the image side; $d_i$ (i=1 to 12): the distance between the i-th and (i+1)th lens surfaces; $n_j$ (j=1 [7]): the refractive indices of the j-th lens; Abbe number $v_j$ (j=1 to 7) is assigned from the object side to the image side as shown in FIG. 1. Both the refractive indices and Abbe number are concerned with the d-line.

EMBODIMENT 1
F/No = 3.5   f = 43.0   m = −0.112   ω = 19.4
$f/f_{12}$ = 1.027   $n_1 - n_2$ = −0.0202

| i | $r_i$ | $d_i$ | j | $n_j$ | $v_j$ |
|---|---|---|---|---|---|
| 1 | 17.947 | 5.625 | 1 | 1.73500 | 49.76 |
| 2 | 206.096 | 1.467 | 2 | 1.75520 | 27.51 |
| 3 | 36.687 | 0.500 | | | |
| 4 | 14.236 | 3.240 | 3 | 1.75520 | 27.51 |
| 5 | 9.765 | 3.386 | | | |
| 6 | ∞ (Aperture) | 6.788 | | | |
| 7 | −7.957 | 2.196 | 4 | 1.75520 | 27.51 |
| 8 | −10.471 | 0.500 | | | |
| 9 | −84.131 | 1.000 | 5 | 1.84666 | 23.89 |
| 10 | 223.766 | 4.590 | 6 | 1.73500 | 49.76 |
| 11 | −17.810 | 29.421 | | | |
| 12 | ∞ | 0.700 | 7 | 1.51633 | 64.15 |
| 13 | ∞ | | | | |

EMBODIMENT 2
F/No = 3.5   f = 43.0   m = −0.112   ω = 19.4
$f/f_{12}$ = 1.037   $n_1 - n_2$ = −0.0306

| i | $r_i$ | $d_i$ | j | $n_j$ | $v_j$ |
|---|---|---|---|---|---|
| 1 | 18.544 | 6.858 | 1 | 1.81600 | 46.62 |
| 2 | 83.604 | 1.777 | 2 | 1.84666 | 23.89 |
| 3 | 33.186 | 0.500 | | | |
| 4 | 12.824 | 2.174 | 3 | 1.84666 | 23.89 |
| 5 | 9.517 | 4.115 | | | |
| 6 | ∞ (Aperture) | 6.032 | | | |
| 7 | −8.477 | 1.494 | 4 | 1.84666 | 23.89 |
| 8 | −10.491 | 0.500 | | | |
| 9 | −67.051 | 2.419 | 5 | 1.84666 | 23.89 |
| 10 | 322.136 | 5.741 | 6 | 1.81600 | 46.62 |
| 11 | −19.524 | 28.003 | | | |
| 12 | ∞ | 0.700 | 7 | 1.51633 | 64.15 |
| 13 | ∞ | | | | |

EMBODIMENT 3
F/No = 3.5   f = 43.0   m = −0.112   ω = 19.4
$f/f_{12}$ = 1.052

| i | $r_i$ | $d_i$ | j | $n_j$ | $v_j$ |
|---|---|---|---|---|---|
| 1 | 18.114 | 6.904 | 1 | 1.81600 | 46.62 |
| 2 | 80.068 | 1.810 | 2 | 1.84666 | 23.89 |
| 3 | 31.795 | 0.500 | | | |
| 4 | 12.438 | 1.978 | 3 | 1.84666 | 23.89 |
| 5 | 9.375 | 3.988 | | | |
| 6 | ∞ (Aperture) | 6.168 | | | |
| 7 | −8.315 | 1.589 | 4 | 1.84666 | 23.89 |
| 8 | −10.423 | 0.500 | | | |
| 9 | −67.589 | 2.394 | 5 | 1.84666 | 23.89 |
| 10 | 317.465 | 5.794 | 6 | 1.81600 | 46.62 |
| 11 | −19.657 | 27.708 | | | |
| 12 | ∞ | 0.700 | 7 | 1.51633 | 64.15 |
| 13 | ∞ | | | | |

EMBODIMENT 4
F/No = 3.5   f = 43.0   m = −0.112   ω = 19.4
$f/f_{12}$ = 1.063

| i | $r_i$ | $d_i$ | j | $n_j$ | $v_j$ |
|---|---|---|---|---|---|
| 1 | 17.768 | 6.893 | 1 | 1.81600 | 46.62 |
| 2 | 74.088 | 1.804 | 2 | 1.84666 | 23.89 |
| 3 | 30.672 | 0.500 | | | |
| 4 | 12.338 | 1.785 | 3 | 1.84666 | 23.89 |
| 5 | 9.418 | 3.897 | | | |
| 6 | ∞ (Aperture) | 6.347 | | | |
| 7 | −8.184 | 1.693 | 4 | 1.84666 | 23.89 |
| 8 | −10.303 | 0.500 | | | |
| 9 | −66.608 | 2.191 | 5 | 1.84666 | 23.89 |
| 10 | 338.658 | 5.676 | 6 | 1.81600 | 46.62 |
| 11 | −19.649 | 27.811 | | | |
| 12 | ∞ | 0.700 | 7 | 1.51633 | 64.15 |
| 13 | ∞ | | | | |

EMBODIMENT 5
F/No = 3.5   f = 43.0   m = −0.112   ω = 19.4
$f/f_{12}$ = 1.074

| i | $r_i$ | $d_i$ | j | $n_j$ | $v_j$ |
|---|---|---|---|---|---|
| 1 | 16.940 | 5.970 | 1 | 1.74400 | 44.79 |
| 2 | −450.421 | 1.168 | 2 | 1.75520 | 27.51 |
| 3 | 32.750 | 0.500 | | | |
| 4 | 13.584 | 2.568 | 3 | 1.75520 | 27.51 |
| 5 | 9.554 | 3.139 | | | |
| 6 | ∞ (Aperture) | 6.711 | | | |
| 7 | −7.931 | 1.711 | 4 | 1.75520 | 27.51 |
| 8 | −10.252 | 0.500 | | | |
| 9 | −54.387 | 1.000 | 5 | 1.72825 | 28.46 |
| 10 | 59.696 | 5.081 | 6 | 1.74400 | 44.79 |
| 11 | −17.302 | 29.478 | | | |
| 12 | ∞ | 0.700 | 7 | 1.51633 | 64.15 |
| 13 | ∞ | | | | |

EMBODIMENT 6

F/No = 3.5   f = 43.0   m = −0.112   ω = 20.4
$f/f_{12} = 1.086$

| i | $r_i$ | $d_i$ | j | $n_j$ | $\nu_j$ |
|---|---|---|---|---|---|
| 1 | 16.899 | 5.520 | 1 | 1.74400 | 44.79 |
| 2 | −1045.152 | 1.174 | 2 | 1.75520 | 27.51 |
| 3 | 33.466 | 0.500 | | | |
| 4 | 13.884 | 2.813 | 3 | 1.75520 | 27.51 |
| 5 | 9.520 | 3.323 | | | |
| 6 | ∞ (Aperture) | 6.719 | | | |
| 7 | −7.818 | 1.944 | 4 | 1.75520 | 27.51 |
| 8 | −10.299 | 0.500 | | | |
| 9 | −67.420 | 1.000 | 5 | 1.72825 | 28.46 |
| 10 | 146.913 | 4.759 | 6 | 1.74400 | 44.79 |
| 11 | −16.922 | 28.077 | | | |
| 12 | ∞ | 0.700 | 7 | 1.51633 | 64.15 |
| 13 | ∞ | | | | |

EMBODIMENT 7

F/No = 3.5   f = 43.0   m = −0.112   ω = 19.4
$f/f_{12} = 1.090$

| i | $r_i$ | $d_i$ | j | $n_j$ | $\nu_j$ |
|---|---|---|---|---|---|
| 1 | 16.625 | 5.849 | 1 | 1.74400 | 44.79 |
| 2 | −956.545 | 1.034 | 2 | 1.75520 | 27.51 |
| 3 | 32.025 | 0.500 | | | |
| 4 | 13.573 | 2.514 | 3 | 1.75520 | 27.51 |
| 5 | 9.513 | 3.110 | | | |
| 6 | ∞ (Aperture) | 6.749 | | | |
| 7 | −7.807 | 1.625 | 4 | 1.75520 | 27.51 |
| 8 | −10.044 | 0.500 | | | |
| 9 | −50.661 | 1.000 | 5 | 1.72825 | 28.46 |
| 10 | 63.772 | 5.075 | 6 | 1.74400 | 44.79 |
| 11 | −16.985 | 29.761 | | | |
| 12 | ∞ | 0.700 | 7 | 1.51633 | 64.15 |
| 13 | ∞ | | | | |

EMBODIMENT 8

F/No = 3.5   f = 43.0   m = −0.112   ω = 19.4
$f/f_{12} = 1.100$

| i | $r_i$ | $d_i$ | j | $n_j$ | $\nu_j$ |
|---|---|---|---|---|---|
| 1 | 16.490 | 5.783 | 1 | 1.74400 | 44.79 |
| 2 | −9098.763 | 1.000 | 2 | 1.75520 | 27.51 |
| 3 | 31.841 | 0.500 | | | |
| 4 | 13.643 | 2.494 | 3 | 1.75520 | 27.51 |
| 5 | 9.540 | 3.062 | | | |
| 6 | ∞ (Aperture) | 6.723 | | | |
| 7 | −7.788 | 1.638 | 4 | 1.75520 | 27.51 |
| 8 | −10.063 | 0.500 | | | |
| 9 | −50.395 | 1.000 | 5 | 1.72825 | 28.46 |
| 10 | 67.747 | 5.012 | 6 | 1.74400 | 44.79 |
| 11 | −16.928 | 29.906 | | | |
| 12 | ∞ | 0.700 | 7 | 1.51633 | 64.15 |
| 13 | ∞ | | | | |

EMBODIMENT 9

F/No = 3.5   f = 43.0   m = −0.112   ω = 19.4
$f/f_{12} = 1.117$

| i | $r_i$ | $d_i$ | j | $n_j$ | $\nu_j$ |
|---|---|---|---|---|---|
| 1 | 16.606 | 6.786 | 1 | 1.81600 | 46.62 |
| 2 | 58.666 | 1.619 | 2 | 1.84666 | 23.89 |
| 3 | 27.485 | 0.703 | | | |
| 4 | 11.218 | 1.282 | 3 | 1.84666 | 23.89 |
| 5 | 8.844 | 4.088 | | | |
| 6 | ∞ (Aperture) | 5.933 | | | |
| 7 | −7.887 | 1.875 | 4 | 1.84666 | 23.89 |
| 8 | −10.152 | 0.500 | | | |
| 9 | −58.509 | 2.113 | 5 | 1.84666 | 23.89 |
| 10 | 1775.017 | 5.442 | 6 | 1.81600 | 46.62 |

-continued

EMBODIMENT 9

F/No = 3.5   f = 43.0   m = −0.112   ω = 19.4
$f/f_{12} = 1.117$

| i | $r_i$ | $d_i$ | j | $n_j$ | $\nu_j$ |
|---|---|---|---|---|---|
| 11 | −19.061 | 28.277 | | | |
| 12 | ∞ | 0.700 | 7 | 1.51633 | 64.15 |
| 12 | ∞ | | | | |

What is claimed is:

1. A reading lens system for a scanner, used at a reduced magnification so as to read an original image at a high speed and comprising, successively in order from an object toward an image:

(a) a first lens unit including a positive lens serving as a first lens and a negative lens serving as a second lens and being cemented on the image side of said first lens;

(b) a second lens unit including a meniscus lens serving as a third lens having a convex surface facing the object;

(c) a third lens unit including a meniscus lens serving as a fourth lens having a convex surface facing the image;

(d) a fourth lens unit including a double-concave lens serving as a fifth lens and a double-convex lens serving as a sixth lens and being cemented on the image side of said fifth lens;

(e) a fifth lens unit including a plane-parallel glass plate serving as a seventh lens; and (f) an aperture disposed between said second lens unit and said third lens unit, said reading lens system meeting the following conditions:

$$1.01 < f/f_{12} < 1.05 \quad (1\text{-I})$$

$$0.02 < n_2 - n_1 \quad (1\text{-II})$$

where f is the focal length of the entire reading lens system; $f_{12}$ is the focal length of said first lens unit; and $n_1$, $n_2$ are refractive indices of material composing the first lens and the second lens.

2. A reading lens system for a scanner used at a reduced magnification so as to read an original image at a high speed and comprising, successively in order from an object toward an image:

(a) a first lens unit including a positive lens serving as a first lens and a negative lens serving as a second lens and being cemented on the image side of said first lens;

(b) a second lens unit including a meniscus lens serving as a third lens having a convex surface facing the object;

(c) a third lens unit including a meniscus lens serving as a fourth lens having a convex surface facing the image;

(d) a fourth lens unit including a double-concave lens serving as a fifth lens and a double-convex lens serving as a sixth lens and being cemented on the image side of said fifth lens;

(e) a fifth lens unit including a plane-parallel plate serving as a seventh lens, (f) an aperture disposed between said second lens unit and said third lens unit, said reading lens system meeting the following condition:

$$1.05 \leq f/f_{12} \leq 1.15 \quad (2\text{-I})$$

where f is the focal length of the entire reading lens system, and $f_{12}$ is the focal length of said first lens unit.

* * * * *